3,849,366
EPOXY RESIN COMPOSITIONS AND PROCESSES
FOR PREPARING SAME
Charles T. Patrick, Jr., Centerville, Ohio, assignor to
NDM Corporation, Dayton, Ohio
No Drawing. Filed Nov. 22, 1971, Ser. No. 201,212
Int. Cl. C08g 51/04
U.S. Cl. 260—37 EP
10 Claims

ABSTRACT OF THE DISCLOSURE

A storage stable, one-component polyepoxide composition containing a readily curable, thixotropic mixture of a polyepoxide compound, a latent curing agent, an accelerator, a thixotroping agent and filler, and process for preparing same.

---

The present invention relates to novel epoxy resin compositions and processes for preparing same. More particularly, the instant discovery concerns one-component, storable, readily curable polyepoxides having superior properties and suitable as adhesive filler compositions, such as body solders.

Typical of the more common drawbacks heretofore encountered with such fillers are slow curing, the need for two or more components requiring metering and mixing equipment, cratering, sagging, run-off, poor impact strength, poor moisture resistance, crawling, and the like, as well as poor properties insofar as hot sanding, feathering, adhesion, paint acceptance, gloss characteristics, and the like, are concerned. Any of these handicaps is particularly undesirable when the body solder is used, for instance, to mask exterior coach or lap joints connecting two metallic car body panels. These joints are generally lapped and spot welded; also, they are usually depressed from the normal contour of the jointed panels and the adhesive masking composition is used to fill the resulting recessed area.

Ideally, upon filling the recessed area with adhesive filler, curing the latter, sanding the resulting hardened adhesive to match the contour of the connected panels, and then coating both panels and the filler with a lacquer or enamel, the human eye should not be able to distinquish the filler surface from the adjacent metal panel surfaces. In other words, the ultimate goal is simulation of the contour one can achieve by using a single panel rather than two adjacent, jointed panels.

In addition, it is very important to avoid surface imperfections often caused by the filler itself when curing. For example, the art has been hampered by decomposition of certain filler components during cure, often resulting in gassing, i.e., surface bubbles; another common problem obviated by the present invention is poor thermal conductivity which limits the speed of cure when heating, particularly when large areas are filled. Exotherms from curing reactions heretofore caused gassing as a result of poor conductivity. Of course, all of these drawbacks seriously limited the end uses and affected the applicability of adhesive fillers of the type contemplated herein.

It is very important that the adhesive filler used as, say, an automotive body solder not hinder or prevent the necessary finishing steps following cure, such as sanding, chemical cleaning, painting, and the like. Heretofore, for instance, filler compositions had a tendency to gum when sanding, thus hindering, if not preventing, proper sanding. In the past, finishing (cleaning) chemicals, such as detergents, used on body panels, metal phosphatizing chemicals, solvents used in primers and paint solutions, and other like chemical finishing components, have had a deleterious effect on polyepoxide filler compositions.

Still another requirement of the products contemplated herein is that they be pumpable. Also, as suggested hereinbefore, they must be grindable, i.e., non-gumming; they must be non-sagging at ambient through curing temperatures; they must, of course, be rapid curing, yet as one-component compositions they must be storage stable, e.g., exhibit sufficient shelf life; the cured and finished filler compositions must meet rigid standards as far as physical and environmental properties are concerned. For example, they must have high physical and adhesive strengths, such as high impact and tensile strengths even when applied to metal having oil on its surface and even after long term exposure to humidity. This strength must persist at temperatures as low as about $-40°$ F. or less and at elevated temperatures on the order of $180°$ F. or greater. Of course, the filler composition must not be porous.

While the compositions of the present invention are particularly effective as body solders, their very desirable properties, as will be seen hereinafter, make them suitable for other purposes as well, e.g., laminating, bonding, electrical potting, structural foams, molded structures, coating, packing, and the like. Various suitable substrate materials for these and other similar functions include metals, glass, ceramic, molded resins, textiles, mica, porcelain, and the like.

Prior art of interest are U.S. Pats., 2,768,992, 2,786,-794, 2,855,372, 2,928,809, 2,970,231, 3,010,921, 3,203,-920, 3,256,135, 3,301,804, 3,344,096, 3,386,955, 3,386,-956, 3,396,138, 3,397,157, 3,449,274, 3,471,435, 3,477,-979, 3,484,398, 3,519,591, 3,530,093, 3,553,166, and 3,558,558.

Of particular interest but readily distinguishable are the following: (1) U.S. Pat. No. 2,855,372 which teaches the copolymerization of substituted ureas and dibasic organic acids and the use of the resulting copolymers as reactive epoxy hardeners. By contrast, for example, the preferred monuron accelerator of this invention serves at a low level of concentration as a catalyst; and (2) U.S. 3,256,135 teaches the use of relatively high levels of polyvalent metal chromates to improve adhesive laminates exposed to salt water; such high levels of zinc chromate are deleterious in the compositions of the present invention.

According to the present invention a novel, storage-stable, and rapid curing composition has been discovered which comprises a curable, thixotropic mixture of (a) a liquid polyepoxide component, (b) a latent curing agent, (c) and accelerator to reduce curing temperatures, (d) an asbestos fiber thixotroping agent, and (e) a filler, such as finely-divided metal and mineral inert fillers. Typically, a very effective body solder having good shelf or pot life may be prepared from a curable mixture of (a) a liquid polyepoxide mixture from an epihalohydrin and a dihydric phenol, such as 2,2-bis(4-hydroxyphenyl)propane (Bisphenol A), and a reactive diluent, e.g., the diglycidyl ether of a polyhydric alcohol, such as dipropylene glycol, the mixture having a viscosity below 10,000 centipoises, preferably below about 5,000; (b) dicyandiamide curing agent; (c) monuron accelerator, such as 3-(para-chlorophenyl)-1,1-dimethylurea; (d) resin-grade asbestos fiber thixotroping agent; and (e) a finely-divided, inert, inorganic filler, e.g., aluminum powder, talc, calcium carbonate, and the like, or any combination of these.

Further, it has been found pursuant to the present invention that a small but effective amount of an alkaline earth metal oxide, e.g., lime, significantly enhances the properties of the novel composition of the present invention by acting as a water scavenger and arresting a condition known as gassing.

It has also been discovered that the moisture resistance of, say, a body solder prepared as taught herein is greatly improved by thoroughly blending therein a minor amount of milled zinc chromate of controlled particle size, preferably having a particle size below about 20 microns.

The many epoxy polyethers derived from, for example, polyhydric phenols and halohydrins and suitable for use in the present invention are generally prepared in an alkaline medium, e.g., an alkali metal hydroxide. Typical and preferred polyepoxides are those prepared by reacting polynuclear phenols, such as 2,2-bis(4-hydroxyphenyl) propane (Bisphenol A), 2,2-bis(4-hydroxyphenyl)butane, bis(4-hydroxyphenyl)ethane, 2,2 - bis(4-hydroxyphenyl) pentane, and the like, with an epihalohydrin, including such as epichlorohydrin, epibromohydrin, 3-chloro-1,2-epoxybutane, 3-bromo-1,2-epoxybutane, 3 - bromo - 1,2-epoxyhexane, and the like.

The polyhydric phenols contemplated herein for preparing polyepoxides of the general type suitable for use in the present invention are illustrated hereinabove and may be further demonstrated by the formula:

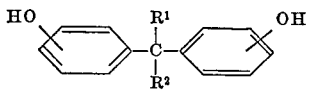

wherein the phenolic moieties may be in any of the 2,2'-, 2,3'-, 2,4'-, 3,3'-, 3,4'-, or 4,4'- positions on the aromatic nuclei, and each of $R^1$ and $R^2$ represents hydrogen, an alkyl group, such as methyl, ethyl, propyl, isopropyl, butyl, sec-butyl, tert-butyl, pentyl, isopentyl, hexyl, isohexyl, and the like; a cyclo(lower)alkyl group, such as a cyclohexyl or substituted cyclohexyl group, e.g., methyl-, ethyl-, propyl-, butyl-, pentyl-, and hexyl-substituted cyclohexyl; or an aromatic group, such as phenyl, tolyl, xylyl, and the like. In addition, the phenolic rings may have other substituents besides the hydroxyl groups, for example, lower alkyl groups containing from 1 to 4 carbon atoms, e.g., methyl, ethyl, propyl, isopropyl, butyl and tertiary butyl; halogen atoms, e.g., fluorine, chlorine, bromine or iodine; and the like.

An illustrative but by no means exhaustive listing of dihydric phenols falling within this general formula includes 4,4'-dihydroxydiphenyldimethylmethane (Bisphenol A), 2,4'-dihydroxydiphenylethylmethane, 3,3' - dihydroxydiphenyldiethylmethane, 3,4'-dihydroxydiphenylmethylpropylmethane, 2,3' - dihydroxydiphenylethylphenylmethane, 4,4' - dihydroxydiphenylpropylphenylmethane, 4,4' - dihydroxydiphenylbutylphenylmethane, 2,2'-dihydroxydiphenylditolylmethane, 4,4'-dihydroxydiphenyltolylmethylmethane, and the like.

Other polyhydric phenols which may also be co-reacted with an epihalohydrin to provide suitable resinous epoxy polyethers are such compounds as resorcinol, hydroquinone, substituted hydroquinones, e.g., p-tertbutylhydroquinone, and the like, indanols such as those disclosed in U.S. Pat. No. 2,754,285 to Petropoulos, and polyhydric phenols having two hydroxy aryl groups separated by an aliphatic chain of at least six carbon atoms in length, said chain being attached by carbon-to-carbon bonding to nuclear carbon atoms of the hydroxyaryl groups. Members of this latter class of polyhydric phenols can be conveniently obtained by condensing phenol itself with a phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenols containing such side chains.

Among other polyhydric alcohols which can be co-reacted with an epihalohydrin to provide suitable resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers, such as 2,3'-dihydroxydiethyl sulfide, 2,2',3,3'-tetrahydroxydipropyl sulfide, and the like, mercapto alcohols, such as α-monothioglycerol, α,α'-dithioglycerol, and the like, polyhydric alcohol partial esters, such as monostearin, pentaerythritol monoacetate and the like, and halogenated polyhydric alcohols, such as the monochloridrins of glycerol, sorbitol, pentaerythritol, and the like.

A related class of polymeric polyepoxides which can be catalyzed according to the practice of the present invention comprises the polyepoxypolyhydroxy polyethers obtained by reacting, again preferably in alkaline medium, a polyhydric phenol, such as bisphenol A, resorcinol, catechol, and the like, or a polyhydric alcohol, such as glycerol, sorbitol, pentaerythritol and the like, with a polyepoxide, such as bis(2,3 - epoxypropyl)ether, bis (2,3-epoxy - 2 - methylpropyl)ether, 1,2 - epoxy-4,5-epoxypentane, and the like.

Still other representative polyepoxides within the purview of the present invention are the following: divinyl benzene dioxide, bis(2,3 - epoxy-cyclopentyl)ether, epoxy ethers of polybasic acids, such as diglycidyl succinate, diglycidyl adipate, diglycidyl maleate, diglycidyl phthalate, digylcidyl hexachloroendomethylenetetrahydrophthalate and diglycidyl 4,4' - isopropylidenedibenzoate, and the like.

The preferred polyepoxides or mixtures of polyepoxides are liquids having viscosities below about 10,000 centipoises at room temperature, preferably below about 5,000 centipoises. Typically, polyepoxides of an epihalohydrin and a polyhydric phenol, such as Bisphenol A, having suitable viscosities are prepared by blending same with minor amounts of polyepoxides of polyhydric alcohols. Generally, the minor component is present in the concentration of about 10 to about 47 percent by weight, preferably about 15 to about 35, based upon the total weight of polyepoxide component in the adhesive filler composition.

The polyepoxide of a polyhydric alcohol, such as epoxidized diethylene glycol, dipropylene glycol, and the like, is present in the role of a flexibilizer which characteristically is of low viscosity and generally functions as a reactive diluent. Of course, other known and similar flexibilizers may be employed, such as epoxidized glycerides of ricinoleic and isoricinoleic acids (e.g., epoxidized castor oil, and the like). These flexibilizers are generally present in minor amounts, as indicated hereinabove, in the polyepoxides of the type prepared from an epihalohydrin and a polyhydric phenol, sufficient flexibilizer and/or reactive diluent being usually provided to achieve liquids of desired viscosities.

Among the many reactive diluents within the purview of the present invention are the mono-functional hydrocarbon glycidyl ethers, e.g., n-butyl glycidyl ether, phenyl glycidyl ether, allyl glycidyl ether, and the like.

The polyepoxides contemplated herein, e.g., the diglycidyl ethers of Bisphenol A, usually have a 1,2-epoxy equivalency of at least about 1.5, preferably at least about 1.8. Likewise, the epoxy equivalent weight is preferably in the range of about 150 to about 300, the more preferred being between about 160 and about 230.

The monuron-type accelerator of the present invention is usually in solid, particulate form and is present in the concentration of about 0.25 to about 4.0 parts, preferably about 1.0 to about 3.0 parts, per 100 parts of liquid polyepoxide component. Monuron is also called 3-(para-chlorophenyl) - 1,1 - dimethylurea, a white crystalline solid having a melting point of about 175° C., and has the formula:

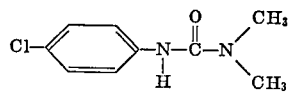

The monuron usually is present in finely-divided form having an average particle size of less than about 50 microns, preferably less than about 25 microns.

Dicyandiamide mentioned hereinbefore as the latent curing agent or reactive hardener is preferably pulverized, e.g., 90 percent by weight smaller than 100 mesh, and 80 percent by weight smaller than 200 mesh. Generally, the dicyandiamide is present in the concentration of about 6 to about 14 parts, preferably about 8 to about 12 parts per 100 parts of liquid polyepoxide component.

The asbestos fiber thixotroping agent is generally present, pursuant to the present invention, in the concentration range of about 6 to about 15 parts by weight per 100 parts by weight of liquid polyepoxide component, preferably about 8 to about 12 parts by weight.

The filler component concentration is generally in the range of about 50 to about 175, preferably about 75 to about 150, parts by weight per 100 parts by weight of liquid epoxide component.

The alkaline earth metal (Ca, Ba, Sr, Mg) oxides contemplated herein are in finely-divided particulate form and incorporated in minor amounts, generally from about 0.5 to 5.0 parts, preferably from about 1.0 to about 3.0 parts by weight, per 100 parts by weight of liquid polyepoxide component.

Insofar as the zinc chromate component is concerned, it has been found that as little as about 0.01 to about 1.5, preferably from about 0.25 to about 1.0, part by weight per 100 parts by weight of liquid polyepoxide component provides very satisfactory moisture resistance characteristics. The zinc chromate best suited for the present invention has an average particle size of less than 20 microns, preferably less than 10 microns.

It has been discovered, pursuant to the present invention, that the very desirable results and superior properties achieved herein are the result of carefully controlling the viscosity of the liquid polyepoxide component as well as the functional groups and epoxy equivalent weight of the polyepoxide. In addition, by carefully controlling, pursuant to the present invention, the concentration and physical properties of the components providing the unique composition, or combination of constituents, herein described, the superior results hereinabove alluded to are achieved.

The following improvements are merely illustrative and by no means limitative:

(a) significantly reduced cure temperatures and rates;
(b) greatly improved impact strength;
(c) no sagging;
(d) very desirable storage stability;
(e) superior pumpability and thermal conductivity;
(f) greatly reduced coefficient of expansion;
(g) improved sanding and feathering properties;
(h) low levels of moisture, which cause gassing under curing conditions, are scavenged by the alkaline earth oxides;
(i) significantly increased moisture resistance due to minor amounts of zinc chromate;
(j) etc., etc.

Again, these are but a few of the superior properties achieved by the very unique compositions of the present invention.

According to one preferred embodiment, the components of the present invention are blended by (1) placing the liquid epoxy components in a suitable container, (2) adding the dicyandiamide and monuron accelerator, mixing for from 5–10 minutes, (3) adding the asbestos and lime, mixing an additional 5–10 minutes and (4) adding the filler and mixing an additional 5–10 minutes or until homogeneous.

If the mixture is to be applied as a body filler or solder, each mixing step may be performed under vacuum or the vacuum may be applied during the last step (4).

The present invention will better be understood from the following examples which are intended to be illustrative and not unduly limitative, all parts given in the examples being by weight unless otherwise indicated:

Examples I–III

The following mixtures were applied to oily metal panels measuring 10 x 10 inches. The mixtures were skived to fill an indentation measuring approximately 0.25 inch in depth and 2 inches in width extending through the center of the panel for its full length. The resulting panels were held vertically in an oven for 10 minutes at 325° F. After cooling for 10 minutes, the cured epoxy compositions, which showed no evidence of sag, were sanded to give a smooth continuous surface essentially concealing the indented area. The panels were then cleaned in a hot detergent solution and passed through a metal phosphating bath. The panels were then dried, spray painted with an automotive primer, baked for 20 minutes at 300° F., cooled and then spray painted with a white automotive top coat and cured for 20 minutes at 300° F. The resulting panels had excellent appearance before and after being exposed to intense ultraviolet and moisture for 2,000 hours in an Atlas Weatherometer.

The uncured compositions had initial viscosities (ASTM-D-1823) of 20–50 seconds for 20 grams of flow thru a 0.104 inch orifice at 80 p.s.i. After storage at room temperature for 60 days, viscosity increases of from 10–15 seconds were observed; materials having viscosities below about 100 seconds are considered acceptable from a pumping standpoint. The uncured materials were unchanged with regard to their sag resistance.

To substitute in these examples a typical commercial treated bentonite for asbestos as the thixotropic agent resulted in viscosity increases to above 100 seconds in 60 days. Likewise, the substitution of commercial fumed silica for asbestos resulted in compositions which sagged upon curing after storage at room temperature for only 30 days.

Deletion of the lime in the compositions shown resulted in excessive gassing during cure which caused imperfections in the ground panels.

TABLE I

| Component | Example | | |
|---|---|---|---|
| | I | II | III |
| DGEBA [1] | 35 | 59 | 85 |
| Aliphatic diglycidyl ether (Epi-Rez 502) [2] | 25 | 21 | 15 |
| Flexible epoxy (Epi-Rez 5132) [3] | 40 | 20 | |
| Dicyandiamide | 8 | 8 | 8 |
| Monuron [4] | 3 | 3 | 1 |
| Lime | 1 | 1 | 1 |
| Asbestos | 8 | 8 | 8 |
| Talc | 34 | | |
| Aluminum powder | 48 | 150 | 150 |

[1] Diglycidyl ether of Bisphenol A.
[2] A low viscosity (20–150 centipoises) aliphatic diglycidyl ether h/ving an epoxy equivalent weight of 300–325 and a flash point of 415° F. Based on infrared analysis, the diglycidyl ether of polypropylene glycol; a product sold by the Celanese Corporation, New York, New York.
[3] An epoxy resin internally modified to provide flexible compositions; viscosity 40,000 to 60,000 centipoises, epoxy equivalent weight of 400–450 and a flash point of 230° F.; significant level of hydrocarbon and ester linkages (infrared and saponification); a product sold by the Celanese Corporation, New York, New York.
[4] 3-(para-chlorophenyl)-1,1-dimethylurea.

Examples IV–VII

The following mixtures were weighed and mixed thoroughly to form an homogeneous, thixotropic material capable of curing on a vertical surface without sagging at a thickness of 0.5 inch. The cure rate (gel time) was measured on a hot metal plate at the temperatures shown. These data show that the monuron is an effective accelerator at the level of 1 to 5 parts per hundred (phr.) of epoxy resin mixture. At a level of 5 phr., some tendency toward gassing was observed.

The mixtures were found to be stable with regard to viscosity and sag resistance for greater than 90 days in closed containers stored at 75–80° F.

TABLE II

| Component | IV | V | VI | VII |
|---|---|---|---|---|
| DGEBA | 85 | 85 | 85 | 85 |
| Aliphatic diglycidyl ether (Epi-Rez 502) [1] | 15 | 15 | 15 | 15 |
| Dicyandiamide | 8 | 8 | 8 | 8 |
| Lime | 1 | 1 | 1 | 1 |
| Monuron [2] | 0 | 1 | 3 | 5 |
| Asbestos | 8 | 8 | 8 | 8 |
| Aluminum powder | 150 | 150 | 150 | 150 |
| Gel time (minutes) at— | | | | |
| 350° F | 7.0 | 3.0 | 2.5 | 2.2 |
| 325° F | >15 | 4.8 | 3.7 | 3.4 |
| 300° F | >15 | 5.3 | 4.3 | 4.1 |
| 275° F | >15 | 7.8 | 5.9 | 5.3 |

[1] See Table I.
[2] 3-(parachlorophenyl)-1,1-dimethylurea.

What is claimed is:

1. A storage-stable, one-component, rapid curing, thixotropic composition which comprises a liquid polyepoxide component having a viscosity below about 10,000 centipoises, and, based upon 100 parts by weight of liquid epoxide component, from about 6 to 14 parts by weight dicyandiamide as latent curing agent, from about 0.25 to about 4.0 parts by weight of monuron accelerator, from about 6 to about 15 parts by weight asbestos fibers as thixotroping agent, from about 50 to about 175 parts by weight of a finely-divided, inert, inorganic filler, and from about 0.5 to about 5.0 parts by weight of an alkaline earth metal oxide.

2. The composition of Claim 1 rendered more moisture resistant by the presence of zinc chromate in the concentration of about 0.01 to about 1.5 parts by weight per 100 parts by weight of liquid epoxide component.

3. The composition of Claim 1 containing both an alkaline earth metal oxide and zinc chromate in the concentration of about 0.01 to about 1.5 parts by weight per 100 parts by weight of liquid epoxide component.

4. The composition of Claim 3 wherein the alkaline earth metal oxide is lime.

5. The composition of Claim 3 wherein the liquid polyepoxide component contains as a major component the diglycidyl ether of a polyhydric phenol.

6. The composition of Claim 5 wherein the polyhydric phenol is 4,4¹-dihydroxydiphenyldimethyl methane.

7. The composition of Claim 5 wherein the liquid polyepoxide component contains as a minor component an epoxidized polypropylene glycol of low viscosity.

8. The composition of Claim 1 wherein the liquid polyepoxide component contains as a major component the diglycidyl ether of a polyhydric phenol.

9. The composition of Claim 8 wherein the polyhydric phenol is 4,4¹-dihydroxydiphenyldimethyl methane.

10. The composition of Claim 8 wherein the liquid polyepoxide component contains as a minor component an epoxidized polypropylene glycol of low viscosity.

References Cited

UNITED STATES PATENTS 3,386,956  6/1968  Nawakowski et al. __ 260—47 EN
3,562,215  2/1971  Moore _____ 260—37 Ep X

OTHER REFERENCES

Lee et al.: Handbook of Epoxy Resins, McGraw-Hill Book Co., 1967, pp. 14–4.

Condensed Chemical Dictionary, 7th Edition, Reinhold Publishing Corp., 1966, page 640.

L. T. JACOBS, Primary Examiner

U.S. Cl. X.R.

260—30.4 Ep